Dec. 13, 1955      O. MANNING      2,726,676

REPLACEMENT HEAD AND SEAT ASSEMBLIES FOR FAUCETS

Filed Aug. 21, 1950

INVENTOR
OSCAR MANNING

BY
W. E. Beatty

ATTORNEY

United States Patent Office 2,726,676
Patented Dec. 13, 1955

2,726,676

REPLACEMENT HEAD AND SEAT ASSEMBLIES FOR FAUCETS

Oscar Manning, Los Angeles, Calif.

Application August 21, 1950, Serial No. 180,545

1 Claim. (Cl. 137—454.6)

The invention relates to a valve and more particularly to improvements in the construction of the valve head and its seat.

An object of the invention is to provide a valve wherein the manual force employed to operate and close the valve is ineffective to force the valve head on its seat, the seating of the valve head being independently brought about by fluid pressure. The advantage of this construction is that the valve head cannot be damaged if undue force is used to close the valve.

Another object of the invention is to provide a valve having a large degree of tolerance whereby the fluid flow is effectively shut off when the valve is closed, avoiding the necessity for a close tolerance of the space relation of the valve head and the seat.

A further object of the invention is to provide a valve which is simple in construction, whereby, for use as a replacement valve, substantially all of the parts can be made on an automatic screw machine.

While the invention is illustrated as applied to a replacement valve, for replacing the valve and seat in an existing faucet, the invention is not restricted to such use as the valve head and seat of this invention may be incorporated in the original construction of the valve.

In co-pending application, Serial Number 148,169, filed March 7, 1950, now abandoned, for "Valve," I have disclosed and claimed a valve of the above nature, wherein the valve head carries an O ring which makes sealing contact at times with the seat. In the former construction, it has been found that when the valve head is moved to open position, the O ring occasionally will blow out of its groove in the valve head. It is believed that this is due to the release of a support for the outlet side of the O ring as the valve is moved to open position. The present invention relates to an improvement in the former construction and has for an object to prevent the O ring from blowing out of its groove when the valve is opened. According to the present invention, this object is accomplished by mounting the O ring in the seat member instead of the valve head member, by providing the valve head with a plug portion which fits in the ring when the flow is shut off, and by providing the valve head with a fluid passage which by-passes the inlet pressure to the outlet side of the O ring before the valve is moved to fully open position. By thus equalizing the pressure at the opposite sides of the O ring during initial opening movement of the valve head, the O ring remains in its groove.

For further details of the invention, reference may be made to the drawings wherein, Fig. 1 is a vertical sectional view of a faucet embodying the present invention as applied to a replacement unit which is shown in side elevation.

Figure 1:
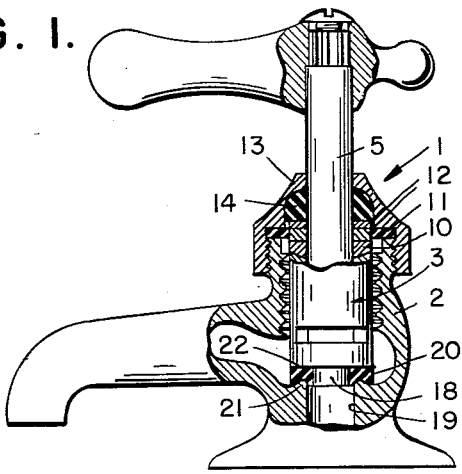
Figure 4:
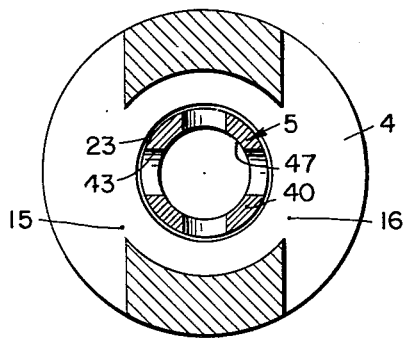
Fig. 4 is a sectional view on line 4—4 of Fig. 3, looking in the direction of the arrows.
Figure 2:
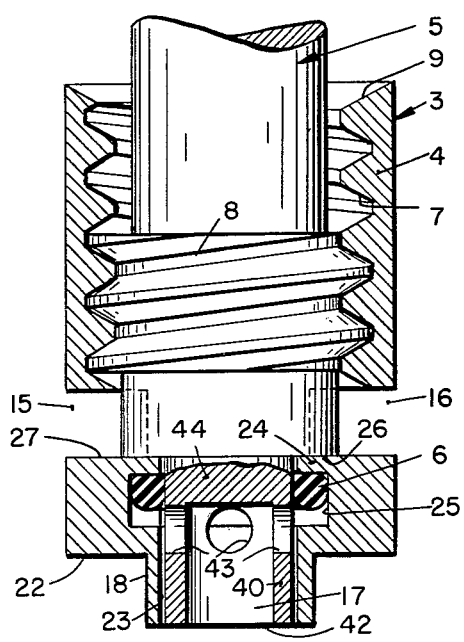
Fig. 2 is an enlarged sectional view of the replacement unit of Fig. 1, with parts broken away, with the valve in closed position.

Referring in detail to the drawings, the faucet 1 is shown as having a casing 2 having a valve head which has been discarded and replaced by the replacement valve unit 3. The unit 3 comprises three parts, namely, a casing 4, a valve stem 5 and O ring 6. The casing 4 has a cylindrical exterior of a diameter small enough to fit inside of the faucet casing 2. The casing 4 at its outer end has an internal screw thread 7 which mates with the thread 8 on the stem 5. The outer end of casing 4 has a bevel 9 to receive the seal ring 10. Other rings indicated at 11 and 12 are placed on ring 10, and in the bonnet 13 is other packing indicated at 14 so as to prevent leakage past the stem 5.

Casing 4, at an intermediate portion thereof at the inner end of the thread 7, has opposed ports 15 and 16 which serve as outlets for fluid entering the inlet 17. The inner end of casing 4 has a reduced neck 18 of smaller diameter than the inlet 19 in the existing faucet. The inner end of casing 4 is sealed against leakage, by means of a sealing ring 20 which fits on the neck 18 and against a shoulder 22 at the outer end of the neck 18. The neck 18 has a length to extend in the inlet 19 as shown in Fig. 1 and the sealing ring 20 is forced against the existing seat 21 in the faucet.

The inner end of casing 4 has a cylindrical bore 23 of which the inner end serves as an inlet 17, the outer end 24 having a groove 25 for O ring 6, of rubber or rubber substitute material.

The bore 23 is cylindrical and the groove 25 is annular and opens into bore 23. The groove 25 has a depth slightly less than the diameter of O ring 6 and the groove 25 has a length substantially greater than the diameter of O ring 6. The closing movement of valve stem 5 is limited by a shoulder 26 on the stem abutting a shoulder 27 which defines one side of the outlet ports 15 and 16 in the casing 4.

The description thus far applies equally to all modifications shown, the difference being in the construction of the valve head.

In the form shown in Figs. 1 to 4 and 6, the valve head is provided with a by-pass groove for the purpose stated above, but in addition the valve head is constructed so as to form a support for the inside of the ring 6 when the valve is open, such support as well as the by-pass port cooperating to prevent the ring 6 from blowing out. In the form shown in Figs. 1 to 4, the stem 5 terminates at its inner end in a sleeve 40 which has a dead-end bore 41, the inner end 42 which is open and exposed to the inlet. Bore 41 is intersected by one or more passages indicated at 43 which open at their outer ends at the periphery of the sleeve 40. When the valve is fully closed, the plug portion 44 extends within the ring 6 and shuts off flow to the outlet 15, 16. As the valve is opened, the inlet pressure is by-passed around the ring 6 through ports like 43, to equalize the pressure on ring 6 before the valve is fully open. When it is fully open, the outer end of sleeve 40 extends inside of ring 6 and supports it and also prevents it from blowing out as the ring cannot leave through the small gap between sleeve 40 and the bore 23. Sleeve 40 serves as a valve head.

Figure 5:
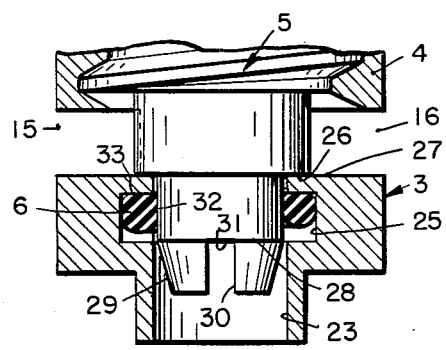
Fig. 5 is a vertical sectional view of a modified form of valve, shown in closed position, with parts broken away.

In the form shown in Fig. 5, the stem 5 has a shoulder 26 which abuts the shoulder 27 on the casing 3 when the valve is fully closed, to limit the inward movement of the stem 5. The stem terminates at its inner end in a valve head 28 which has an external diameter substantially the same as the internal diameter of ring 6. The valve head 28 is imperforate, or a plug to shut off the flow between the ring 6 and outlet 16 when the valve is closed. The valve head 28 is guided into the ring 6 during the closing movement of the valve, by a taper 29 which slopes inwardly in a direction towards the inner end of valve head 28. The taper 29 is entirely at the inlet side of the ring 6 when the valve is closed. The inner end of valve head 28 has a diametrical slot 30, the inner end 31 of which is at the inlet inside of ring 6 when the valve is closed. When the valve is opened, the inlet pressure passes through the slot 30 and around the ring 6 to equalize the pressure on opposite sides of ring 6 and prevent it from being blown out of its groove 25 when the valve head 28 is either partially or entirely withdrawn from inside the ring 6. When the valve is closed, the inlet pressure such as 60 or 100 lbs., p. s. i., acts on the inlet side of ring 6 which is exposed to such inlet pressure as the diameter of the plug portion of valve head 28 is less than the diameter of bore 23. This pressure acts to force the ring into sealing contact against the valve head as shown at 32 and also against the outlet side 33 of the groove 25. With the valve closed, the pressure in outlet 16 is substantially atmospheric and the ring 6 cannot blow out at this time as valve head 28 forms an obstruction. Without the by-pass groove of this invention, when the valve head 28 is opened and withdrawn from the ring 6, the pressure acts inwardly and outwardly as indicated at 32 and 33 to force the ring 6 out of its groove before there can be any equalization of pressure on the ring.

In the form shown in Fig. 5, the slot 30 prevents the valve from chattering when the valve is partially open.

Figure 6:
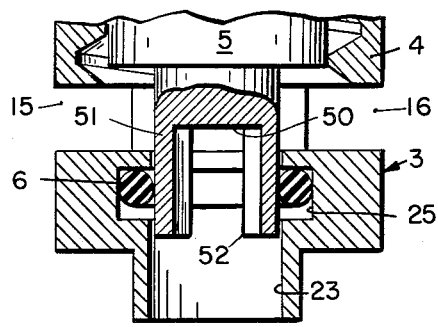
Fig. 6 is a vertical sectional view of a further modification, with parts broken away, the valve being shown in fully open position.
Figure 3:
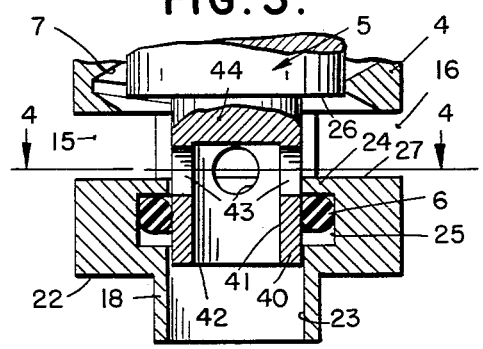
Fig. 3 is a view corresponding to Fig. 2 with parts broken away showing the valve in open position.

In the form shown in Fig. 6, the stem 5 terminates in a wide dead-end slot 50 which is similar to, but larger than, the slot 30 in Fig. 5. Also in Fig. 6, the taper 29 is omitted and the valve head 51 is of uniform outside diameter which is substantially the same as the inside diameter of ring 6. The slot 50 opens at the opposite sides of the periphery of the valve head 51 and its inner end 52 is open and exposed to the inlet pressure in bore 23. The length of slot 50 along the axis of stem 5 is greater than the opening movement of stem 5. As the result of this, when the valve is fully open, as shown in Fig. 6, the valve head 51 is inside of ring 6 to support it and prevent it from blowing out, while slot 50 also relieves the pressure at the outlet side of ring 6 during the initial opening movement of the valve head, as previously described.

In all figures, the valve head is of slightly less diameter than the bore 23 which gives a large tolerance in manufacturing the valve. The only close fit required is between the outside diameter of the valve head and the inside ring 6, although there is some tolerance here as the ring 6 is resilient. Also after the pressure has been equalized, the ring has a much smaller area of contact both with its groove and with the valve head than in the case when the valve is closed. Compare Fig. 3 with Fig. 2 and also compare Fig. 6 with Fig. 5.

The casing 4 and stem 5 may be of metal such as brass or other material.

Various dimensions and modifications may be made in the invention without departing from the spirit of the following claim.

I claim:

A replaceable insert for a faucet having an inlet surrounded by a seat, said insert comprising a unitary hollow casing having an outer end having an internal thread, an intermediate portion having a lateral port and an inner end having an interior groove having an O-ring, and said casing terminating in a reduced neck having a length to extend in said inlet, said neck having an exterior sealing ring for said seat of the faucet, said inner end having a bore of smaller diameter than the diameter of said thread and providing a shoulder at the outer end of said bore and coextensive with the inner side of said port, and a cooperating valve stem having threads for said casing thread and having an imperforate valve stem portion inwardly of said threads of diameter larger than the bore of said inner end of said casing and providing a cooperating shoulder, said stem inwardly of said shoulder being of reduced diameter and having an imperforate portion fitting in said O-ring when said shoulders abut, said inner end of said stem having an axial and lateral passage communicating with said casing port when said stem is operated to raised position, said inner end of said stem extending within said O-ring when said stem is in raised position.

References Cited in the file of this patent

UNITED STATES PATENTS

| | | |
|---|---|---|
| 951,407 | Moore | Mar. 8, 1910 |
| 1,070,741 | Smith | Aug. 19, 1913 |
| 1,606,912 | Young | Nov. 16, 1926 |
| 2,011,333 | Clifton | Aug. 13, 1935 |
| 2,083,584 | Wineman | June 15, 1937 |
| 2,114,139 | Crosthwait | Apr. 12, 1938 |
| 2,159,452 | Samaras | May 23, 1939 |
| 2,360,733 | Smith | Apr. 17, 1944 |
| 2,371,585 | Newell | Mar. 13, 1945 |
| 2,549,010 | Rhodes | Apr. 17, 1951 |
| 2,556,308 | Weatherhead | June 15, 1951 |
| 2,594,626 | Earle | Apr. 29, 1952 |